United States Patent [19]

Koller et al.

[11] 4,259,236
[45] Mar. 31, 1981

[54] AZO COMPOUNDS, CONTAINING A 1,2,4-THIADIAZOLE MOIETY

[75] Inventors: Stefan Koller, Ramlinsburg; Rudolf Zink, Oberwil; Hansrudolf Schwander, Riehen, all of Switzerland

[73] Assignee: Ciba-Geigy Corporation, Ardsley, N.Y.

[21] Appl. No.: 15,511

[22] Filed: Feb. 26, 1979

Related U.S. Application Data

[63] Continuation of Ser. No. 899,934, Apr. 25, 1978, abandoned, which is a continuation of Ser. No. 702,174, Jul. 2, 1976, abandoned.

[30] Foreign Application Priority Data

Jul. 18, 1975 [CH] Switzerland .................. 9439/75

[51] Int. Cl.³ .............. C09B 29/22; C09B 29/36; C09B 31/14
[52] U.S. Cl. ................................. 260/156; 260/154; 260/158
[58] Field of Search ............. 260/158, 156, 154

[56] References Cited

U.S. PATENT DOCUMENTS

| 3,775,049 | 11/1973 | Wolfrum et al. ............. 260/158 |
| 3,963,431 | 6/1976 | Koller et al. ................ 260/158 |

FOREIGN PATENT DOCUMENTS

| 1927416 | 12/1970 | Fed. Rep. of Germany ........... 260/158 |
| 2412108 | 9/1974 | Fed. Rep. of Germany ........... 260/158 |

*Primary Examiner*—John F. Niebling
*Attorney, Agent, or Firm*—Edward McC. Roberts

[57] ABSTRACT

An azo dyestuff which is free from groups conferring solubility in water and has the general formula I

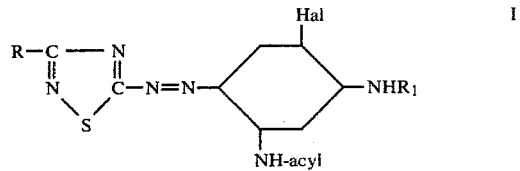

in which R denotes hydrogen, halogen, a hydrocarbon radical with up to 18 carbon atoms which is bonded by means of a direct bond or a sulphur or oxygen atom and can be substituted, trifluoromethyl, cyano, dichlorocyanomethyl, chlorodicyanomethyl, tribromomethyl or trichloromethyl or denotes a heterocyclic radical containing nitrogen, Hal is a halogen atom, $R_1$ is an optionally substituted alkyl group and "acyl" denotes the acyl radical of an organic carboxylic acid, carbamic acid, carbonic acid or sulphonic acid with, preferably up to 0.18 carbon atoms. The new dyestuffs dye polyester fibers in fast red shades.

11 Claims, No Drawings

AZO COMPOUNDS, CONTAINING A 1,2,4-THIADIAZOLE MOIETY

This is a continuation of application Ser. No. 899,934 filed on Apr. 25, 1978, now abandoned, which in turn is a continuation of application Ser. No. 702,174, filed July 2, 1976, now abandoned.

The invention relates to azo compounds which are suitable as dyestuffs, a process for the manufacture of these compounds and the use of these azo compounds for dyeing or printing textiles.

The invention relates to azo dyestuffs which are free from sulphonic acid groups conferring solubility in water and have the general formula I

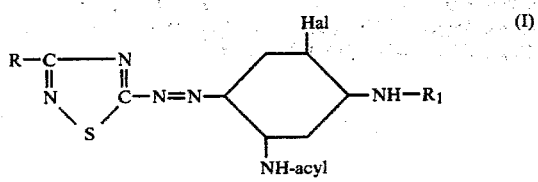

in which R denotes hydrogen, halogen, a hydrocarbon radical with up to 18 carbon atoms which is bonded by means of a direct bond or a sulphur or oxygen atom and can be substituted, trifluoromethyl, cyano, dichlorocyanomethyl, chlorodicyanomethyl, tribromomethyl or trichloromethyl or denotes a heterocyclic radical containing nitrogen, Hal is a halogen atom, $R_1$ is an optionally substituted alkyl group and "acyl" denotes the acyl radical of an organic carboxylic acid, carbamic acid, carbonic acid or sulphonic acid with, preferably, up to 18 carbon atoms.

The invention also relates to a process for the manufacture of these new dyestuffs, which consists in coupling diazonium compounds of amines of the formula

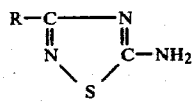

with anilines of the general formula II

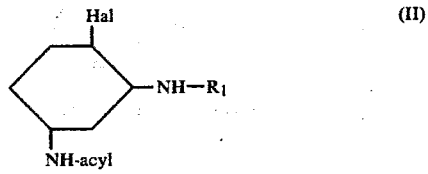

in which R, $R_1$, Hal and acyl have the abovementioned meanings.

Valuable dyestuffs are those in which R denotes hydrogen, halogen, an alkyl group with 1-17 carbon atoms, an alkoxy group with 1-17 carbon atoms, an alkylthio group with 1-17 carbon atoms, an alkylsulphonyl group with 1-17 carbon atoms, a cycloalkyl group, a cycloalkoxy group, an aralkyl group, an aralkylthio group, an aralkylsulphonyl group, an aryl radical, an aryloxy radical, an arylthio radical, an arylsulphonyl radical, a dialkylamino group in which the alkyl chains independently of one another contain 1-7 carbon atoms and which can be cyclised with the formation of a heterocyclic system, a N,N-di-aryl-amino group or a N,N-di-aralkyl-amino group or a heterocyclic radical which contains nitrogen, or denotes trifluoromethyl, cyano, dichlorocyanomethyl, chlorodicyanomethyl, tribromomethyl or trichloromethyl, Hal is chlorine, bromine or fluorine and "acyl" is the radical of an organic carboxylic or sulphonic acid.

The compounds in which R is an optionally substituted alkyl radical with up to 8 carbon atoms, an optionally substituted phenyl radical, a pyridyl radical, a chlorine atom or a radical of the formulae —S—R' and —SO₂—R", in which R' is an optionally substituted aliphatic radical or an aryl radical and R" is an optionally substituted aliphatic radical, and Hal is a chlorine or bromine atom and "acyl" represents the radical of an unsubstituted or substituted fatty acid with up to 18 carbon atoms, an optionally substituted benzoyl radical and the radical of an alkanesulphonic acid with up to 8 carbon atoms are of particular interest.

The "acyl" radical denotes an unsubstituted or substituted fatty acid radical with up to 18 carbon atoms, such as a formyl, acetyl, propionyl, butyryl, 1-methylbutyryl, hexanoyl, crotonyl, octanoyl, decanoyl, dodecanoyl, hexadecanoyl, palmityl or stearyl radical and also denotes a hydroxyacetyl, mercaptoacetyl, methylmercaptoacetyl, chloroacetyl, bromoacetyl, α,β-dibromopropionyl or dichloropropionyl, β-bromopropionyl, 4-chlorobutyryl, cyanoacetyl, acetoacetyl, ethoxyacetyl, 2-phenylbutyryl, 4-benzoylbutyryl, 4-phenylbutyryl, cyclohexanebutyryl, 2-bromostearyl, 11-bromoundecanoyl, palmitoylglycoyl and 3- and 4-hydroxybutyryl radical and the half-esterified dicarboxylic acid radicals of the general formula (aryloxy- or lower alkoxy)-CO—(CH₂)ₘ₋₁—CO—, wherein m is 1 to 9, examples of such radicals being the methoxycarbonyl-carbonyl radical, the C₂H₅—O—CO—(CH₂)₄—CO radical and the p—CH₃—C₆H₄—O—CO—CH₂CH₂—CO radical, half-esterified acyl radicals of oxalic acid, such as the radicals of the formulae CH₃—O—CO—CO—, C₄H₉—O—CO—CO—, p—Cl—C₆H₄—O—CO—CO—, o—CH₃—C₆H₄—O—CO—CO—, p—CH₃C₆H₄O—CO—CO— and p—C₂H₅—O—CO—CO—, the radicals of cycloaliphatic carboxylic acids, such as the cyclohexanecarbonyl, methylcyclohexanecarbonyl and dimethylcyclohexanecarbonyl radical; the radicals of araliphatic carboxylic acids, such as the phenylacetyl, β-phenylpropionyl, phenoxyacetyl, (p-nitro-, p-acetyl-, o-butoxycarbonyl-, o-methoxy-, p-butoxy-, p-methyl-, p-bromo-, 3,5-dichloro-, p-ethyl- and p-chloro)-phenoxyacetyl, phenoxypropionyl, phenoxybutyryl, phenoxythioacetyl, 3,5-dichlorophenylthioacetyl, p-methoxycarbonylphenylmercaptoacetyl, α-phenylmercaptopropionyl, γ-(p-nitrophenylmercapto)-butyryl, phenylaminoacetyl, p-chlorophenylaminoacetyl, m-ethylphenylaminoacetyl, N-morpholinoacetyl, styrylcarbonyl and cinnamylcarbonyl radical; the radicals of aromatic carboxylic acids, such as the benzoyl, methylbenzoyl, p-chlorobenzoyl, p-nitrobenzoyl, 3,5-dinitrobenzoyl, methoxybenzoyl, 4-phenoxybenzoyl-4-phenylbenzoyl, 4-phenyl-mercaptobenzoyl, 4-phenylazobenzoyl, α-naphthoyl and β-naphthoyl radical; and the radicals of heterocyclic carboxylic acids, such as the furoyl, nicotinyl, thiophene-2-carbonyl or pyridine-3- or -4-carbonyl radical.

The acyl radicals can also be derived from alkyl or aryl half-esters of carbonic acid and in that case represent C₁-C₈-alkoxycarbonyl or optionally substituted phenoxycarbonyl groups, such as, for example, methoxycarbonyl, ethoxycarbonyl, n-propoxycarbonyl, isopropoxycarbonyl, β-chloroethoxycarbonyl, β-methoxyethoxycarbonyl, n-butoxycarbonyl, isobutoxycarbonyl and hexyloxycarbonyl groups and also phenoxy-, chlorophenoxy-, bromophenoxy-, nitrophenoxy-, carbethoxyphenoxy-, methoxyphenoxy-, methylphenoxy- or ethylphenoxy-carbonyl radicals.

If the radicals are derived from an alkanesulphonic acid or benzenesulphonic acid, possible radicals are a $C_1$-$C_6$-alkanesulphonyl radical and an optionally substituted benzenesulphonyl radical, such as, for example, methylsulphonyl, ethylsulphonyl, propylsulphonyl, butylsulphonyl, hexylsulphonyl, benzenesulphonyl, methylbenzenesulphonyl, chlorobenzenesulphonyl, bromobenzenesulphonyl, nitrobenzenesulphonyl, and methoxybenzenesulphonyl radicals.

Possible radicals R are, preferably, the groups of the formulae

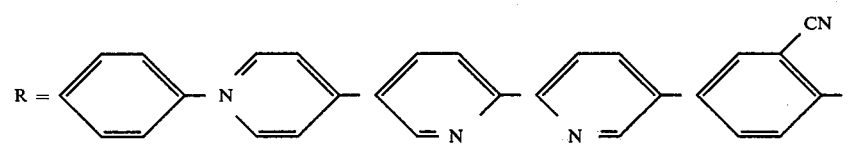

Cl, $CH_3-$, $C_2H_5-$, $C_3H_7-$, $C_4H_9-$, $H_3C-S-$, $H_5C_2-S-$,

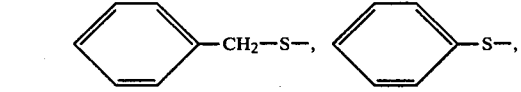

$H_3C-OOC-C_2H_4-S-$, $H_5C_2OOC-C_2H_4-S-$, $H_7C_3OOC-C_2H_4-S-$, $HO-C_2H_4-OOC-C_2H_4-S-$, $HO-C_2H_4-S-$, $H_3C-O-C_2H_4-S-$, $H_5C_2-O-C_2H_4-S-$, $(H_5C_2)_2-N-OC-C_2H_4-S-$, $H_5C_2-SO_2-$ and $H_3C-SO_2-$.

Individual preferred acyl groups are those which follow: $-OC-CH_3$, $-OC-C_2H_5$, $-OC-C_2H_4-Cl$, $-OC-C_2H_4-COO-CH_3$, $-O_2S-CH_3$,

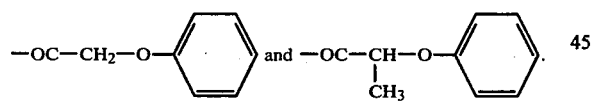

Possible radicals $R_1$ are alkyl radicals which have 1 to 18 carbon atoms and can be substituted, such as, for example, by hydroxyl, halogen, cyano, aryl, cyanoethoxy, lower alkoxy, $C_1$-$C_{17}$-alkylcarbonyloxy, $C_1$-$C_{10}$-alkoxycarbonyl, $C_1$-$C_{10}$-alkoxycarbonyloxy, $C_1$-$C_{10}$-alkylaminocarbonyloxy, $C_1$-$C_{17}$-alkylcarbonylamino, $C_1$-$C_{10}$-alkylcarbonyl, optionally substituted benzoyloxy, phenoxycarbonyl, phenoxycarbonyloxy and phenylaminocarbonyloxy, halogenated $C_1$-$C_{10}$-alkylcarbonyloxy, arylsulphonyl, β-carboxyethyl or optionally substituted phenoxy.

Suitable radicals $R_1$ are, for example, $CH_3$, $C_2H_5$, $C_3H_7$, $C_4H_9$, $C_5H_{11}$, $C_8H_{17}$, $C_{10}H_{21}$, $C_{18}H_{37}$, $-CH_2-CH=CH_2$, $CH_2C_6H_5$, $-CH_2C_6H_4(OCH_3, Cl$ or $NO_2)$, $CH_2CH_2C_6H_5$, $CH_2CH_2Cl$, $CH_2CF_3$, $CH_2CH_2Br$, $CH_2-CHCl-CH_2Cl$, $-CH_2-CH(OH)-CH_2Cl$, $CH_2-CH(OCOCH_3)-CH_2Cl$, $CH_2-CH(COCH_3)-CH_2CN$, $CH_2CH_2CN$, $CH_2CH_2OCH_2CH_2CN$, $CH_2CH_2OH$, $CH_2CH_2OCH_3$, $CH_2CH_2CH_2CH_2-O-CH_3$, $CH_2CH(OH)CH_2(OH)$, $CH_2CH_2OC_4H_9$, $CH_2CH_2OCH_2CH_2OH$, $CH_2CH_2OCH_2CH_2OCOCH_3$, $CH_2CH_2O-CHO$, $CH_2CH_2-O-COCH_3$, $CH_2CH_2OCOC_2H_5$, $CH_2CH_2O-COC_5H_{11}$, $CH_2CH_2O-CO-C_{18}H_{37}$, $CH_2CH_2-O-CO-C_{18}H_{35}$, $CH_2CH_2CH_2CH_2-O-COCH=CH_2$, $-CH_2-CH(OCOCH_3)-CH_2OCOCH_3$, $-CH_2CH_2COCH_2Cl$, $-CH_2CH_2OCO-CHBr.CH_2Br$, $-CH_2CH_2-O-CO-CHCl-CH_2Cl$, $-CH_2-CH_2-O-CO-CH_2COCH_3$, $-CH_2CH_2OCOC_6H_5$, $-CH_2CH_2OCOC_6H_4(Cl, Br, NO_2, SO_2N(CH_3)_2, CH_3$ or $-OC_2H_5)$, $-CH_2CH_2OCOCH_2C_6H_5$, $-CH_2CH_2-O-CO-CH_2O-C_6H_5$, $-CH_2CH_2O-CO-O(CH_3, C_2H_5, C_3H_7$ or $C_6H_5)$, $-CH_2CH_2-CO-O-(C_2H_5, C_3H_7, C_4H_9$ or $C_{10}H_{21})$, $CH_2CH_2NHCOCH_3$, $CH_2CH_2CH_2NHCOC_2H_5$, $CH_2CH_2NHCOC_6H_5$, $CH_2CH_2O-CO-NHC_2H_5$, $CH_2CH_2-O-CO-NH-C_4H_9$, $CH_2CH_2O-CO-NH-C_6H_5$,

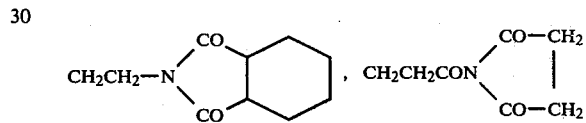

$CH_2CH_2-SOCH_2CH_3$, $CH_2CH_2-SO_2-CH=CH_2$, $-CH_2CH_2-SO_2-C_6H_5$, $-CH_2CH_2-SO_2-C_6H_4l$ ($CH_3$ or Cl), $CH_2CONH_2$, $-CH_2CO-NH-(C_4H_9$ or $CH_3)$, $CH_2CH_2-O-C_6H_5$, $CH_2CH_2OC_6H_4(Cl, NO_2, CH_3$ or $OCH_3)$, $-CH_2CH_2OCOCH_2(OH, CN, OCH_3$ or $OCOCH_3)$ and $-CH_2CH_2COCH_3$.

Particularly preferred radicals $R_1$ are those of the formulae $-CH_3$, $-C_2H_5$, $-C_3H_7$,

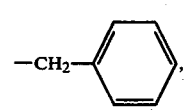

$-C_4H_9$, $-C_2H_4-Cl$, $-C_2H_4-Br$,

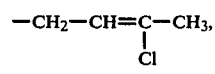

$-C_2H_4-OH$, $-C_4H_8-OH$,

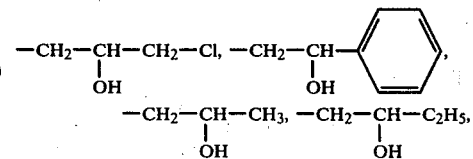

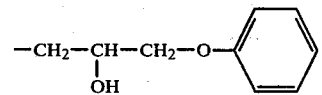

—C₂H₄—OCH₃, —C₂H₄—O—C₂H₅, —C₂H₄—O—C₃H₇, —C₂H₄—O—C₂H₄—CN,

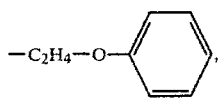

—C₂H₄—CN, —C₂H₄—COO—CH₃, —C₂H₄—COO—C₂H₅, —C₂H₄—COO—C₃H₇, —C₂H₄—COO—C₄H₉, —C₂H₄—COO—C₂H₄—O—CH₃, —C₂H₄—COO—C₂H₄—O—C₂H₅ and

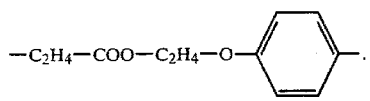

Possible diazo components are, in particular, the following 1,2,4-thiadiazoles: 3-(2'-cyanophenyl)-5-amino-1,2,4-thiadiazole, 5-amino-1,2,4-thiadiazole, 3-phenyl-5-amino-1,2,4-thiadiazole, 3-p-tolyl-5-amino-1,2,4-thiadiazole, 3-2',4'-dimethylphenyl-5-amino-1,2,4-thiadiazole, 3-p-chlorophenyl-5-amino-1,2,4-thiadiazole, 3-m-chlorophenyl-5-amino-1,2,4-thiadiazole, 3-2',4'-dichlorophenyl-5-amino-1,2,4-thiadiazole, 3-p-nitrophenyl-5-amino-1,2,3-thiadiazole, 3-m-nitrophenyl-5-amino-1,2,4-thiadiazole, 3-p-methoxycarbonylphenyl-5-amino-1,2,4-thiadiazole, 3-methyl-5-amino-1,2,4-thiadiazole, 3-ethyl-5-amino-1,2,4-thiadiazole, 3-n-hexyl-5-amino-1,2,4-thiadiazole, 3-methoxy-5-amino-1,2,4-thiadiazole, 3-ethoxy-5-amino-1,2,4-thiadiazole, 3-β-chloroethoxy-5-amino-1,2,4-thiadiazole, 3-cyclohexoxy-5-amino-1,2,4-thiadiazole, 3-phenoxy-5-amino-1,2,4-thiadiazole, 3-benzyl-5-amino-1,2,4-thiadiazole, 3-benzyloxy-5-amino-1,2,4-thiadiazole, 3-methylthio-5-amino-1,2,4-thiadiazole, 3-ethyl-thio-5-amino-1,2,4-thiadiazole, 3-n-propylthio-5-amino-1,2,4-thiadiazole, 3-n-butylthio-5-amino-1,2,4-thiadiazole, 3-tert.-butylthio-5-amino-1,2,4-thiadiazole, 3-n-hexylthio-5-amino-1,2,4-thiadiazole, 3-n-dodecylthio-5-amino-1,2,4-thiadiazole, 3-phenylthio-5-amino-1,2,4-thiadiazole, 3-benzyl-thio-5-amino-1,2,4-thiadiazole, 3-β-alkoxycarbonylethylmercapto-5-amino-1,2,4-thiadiazoles with, preferably, 1–5 C atoms in the alkoxy radical, 3-β-hydroxyethoxycarbonylethylmercapto-5-amino-1,2,4-thiadiazole, 3-β-dialkylaminocarbonylethylmercapto- and 3-β-monoalkylaminocarbonylethylmercapto-5-amino-1,2,4-thiadiazoles with 1–5 C atoms and, optionally, hydroxyl or cyano groups in the alkyl radical, 3-methylsulphonyl-5-amino-1,2,4-thiadiazole, 3-ethylsulphonyl-5-amino-1,2,4-thiadiazole, 3-n-butylsulphonyl-5-amino-1,2,4-thiadiazole, 3-tert.-butylsulphonyl-5-amino-1,2,4-thiadiazole, 3-benzylsulphonyl-5-amino-1,2,4-thiadiazole, 3-chloro-1,2,4-thiadiazole and 3-trichloromethyl-1,2,4-thiadiazole.

Diazo components can be prepared, according to J. Goerdeler et al., from guanidines, nitriles, cyanic acid esters and thiuronium compounds by reaction with a thiocyanate and chlorine under alkaline conditions [Chem. Ber. 88 (1955) 1071, Chem. Ber. 87 (1954) 57, Chem. Ber. 88 (1955) 843 and Chem. Ber. 89 (1956) 1033].

Preferred coupling components are those of the formula (IV)

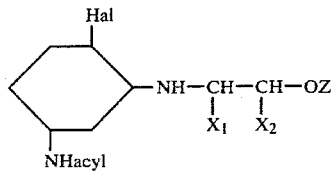

wherein Hal and acyl have the same meaning as above, one X denotes hydrogen and the other X denotes an optionally substituted lower alkyl, cycloalkyl, aryl or aralkyl radical and Z is a hydrogen atom or an acyl.

Possible radicals for Z are the same radicals as those indicated for the "acyl" radicals bonded via a carbonyl group.

X is preferably a lower alkyl radical, especially methyl or ethyl, or phenyl.

The last-mentioned coupling components are manufactured according to methods which are in themselves known, for example by an addition reaction with epoxy compounds.

The addition reaction is carried out in the presence of an alkali, preferably alkali metal hydroxides, such as potassium hydroxide or sodium hydroxide, in inert organic solvents, for example weakly ionising solvents, such as methyl ethyl ketone, or, preferably, strongly ionising solvents, such as dimethylformamide, dimethylacetamide, N-methylpyrrolidone, dimethylsulphoxide and sulpholane (tetramethylenesulphone). The epoxide is preferably used in an excess of at least 1.2 mols per mol of aniline and especially 1.5 mols per mol of aniline. The addition reaction is carried out at elevated temperature, for example 30° to 200° C., preferably 40° to 80° C.

Two isomeric compounds of the formulae

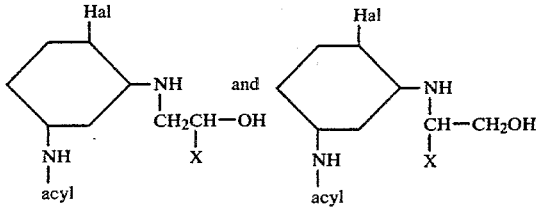

can form during this addition reaction.

If Z in formula (IV) represents an acyl radical, the addition products of the formula IV are acylated with a compound which introduces the acyl radical Z.

Epoxides which can be used are: 1,2-epoxybutane, 2,3-epoxybutane, the glycidyl esters of acrylic, methacrylic, benzoic, palmitic or stearic acid, glycidyl tosylate, glycidyl carbonilate (glycidyloxycarbonylaminobenzene) and epoxyethyl-benzene (styrene oxide) and also glycidyl ether compounds such as ethyl glycidyl ether, glycidyl isopropyl ether, 1-glycidyl-2-methoxyethane, 1-glycidyl-2-ethoxyethane, 1-glycidyl-2-butoxyethane, 1-glycidyl-2-phenoxyethane, 1-glycidyl-2-benzoyloxyethane, 1-glycidyl-2-methoxyethoxyethane, 1-glycidyl-2-ethoxyethoxyethane, 1-glycidyl-2-butoxyethoxyethane, 1-glycidyl-2-phenoxyethoxyethane, 1-glycidyl-2-benzyloxyethoxyethane, 1-glycidyl-2-butoxyethoxyethoxyethane, 1-glycidyl-2-phenoxyethoxyethane of the formula

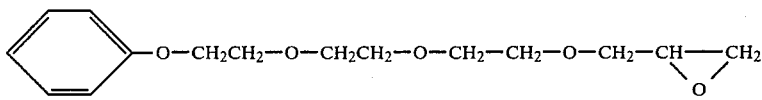

1,2-epoxy-3-phenoxypropane, 1,2-epoxy-3-(p-nitrophenoxy)propane and epichlorohydrin, and methyl glycidyl ether, methyl α-methylglycidyl ether, methyl β-methylglycidyl ether, ethyl β-methylglycidyl ether, n-propyl glycidyl ether, n-propyl β-methylglycidyl ether, i-propyl β-methylglycidyl ether, n-butyl glycidyl ether, n-butyl β-methylglycidyl ether, i-butyl glycidyl ether, i-butyl β-methylglycidyl ether, tert.-butyl glycidyl ether, tert.-butyl β-methylglycidyl ether, n-amyl glycidyl ether, n-amyl β-methylglycidyl ether, n-hexyl glycidyl ether, n-hexyl β-methylglycidyl ether, n-heptyl glycidyl ether, n-heptyl β-methylglycidyl ether, benzyl glycidyl ether, benzyl β-methyl-glycidyl ether, allyl glycidyl ether, allyl β-methylglycidyl ether, methallyl glycidyl ether, methallyl β-methylglycidyl ether, phenyl β-methylglycidyl ether, o-tolyl glycidyl ether, m-tolyl glycidyl other, phenyl glycidyl ether, pentachlorophenyl glycidyl ether, α-naphthyl glycidyl ether, α-naphthyl β-methylglycidyl ether and β-naphthyl glycidyl ether.

Where alkyl, alkoxy, alkylmercapto, alkylamino and dialkylamino groups are mentioned in the foregoing text, these are, as a rule, intended to signify low-molecular groups with 1–5 C atoms. The diazotisation of the diazo compounds mentioned can be effected with the aid of procedures which are in themselves known, for example with the aid of mineral acids and sodium nitrite or, for example, with a solution of nitrosylsulphuric acid in concentrated sulphuric acid.

The coupling reaction can also be carried out in a known manner, for example in a neutral to acid medium and optionally in the presence of sodium acetate or similar buffer substances which influence the rate of coupling, or in the presence of catalysts, for example dimethylformamide or pyridine or salts thereof.

The new compounds, which are insoluble in water, are disperse dyestuffs. The compounds themselves, mixtures thereof or mixtures thereof with other azo dyestuffs are particularly suitable for dyeing and printing semi-synthetic and fully synthetic fibres, for example acrylic fibres or acrylonitrile fibres, polyacrylonitrile fibres and fibres consisting of copolymers of acrylonitrile and other vinyl compounds, such as, for example, acrylic esters, acrylamides, vinylpyridine, vinyl chloride or vinylidene chloride, fibres consisting of copolymers of dicyanomethylene and vinyl acetate and of acrylonitrile block copolymers, fibres consisting of polyurethanes, base-modified polyolefines, for example polypropylene, cellulose triacetate and cellulose 2½-acetate and polyamides, for example nylon 6, nylon 6,6 or nylon 12, and especially fibres consisting of aromatic polyesters, for example those of terephthalic acid and ethylene glycol or 1,4-dimethylcyclohexane and fibres consisting of copolymers of terephthalic acid and isophthalic acid and ethylene glycol.

For dyeing from aqueous liquors, the compounds are advantageously employed in a finely divided form and dyeing is carried out in the presence of dispersing agents, for example cellulose sulphite waste liquor or synthetic detergents or in the presence of a combination of various wetting agents and dispersing agents. As a rule, it is advisable, prior to dyeing, to convert the dyestuffs to be used into a dyestuff formulation which contains a dispersing agent and the finely divided dyestuff in a form such that a fine dispersion is formed when the dyestuff formulations are diluted with water. Dyestuff formulations of this type can be produced in a known manner, for example by grinding the dry or wet dyestuff, and it is possible to effect grinding with or without the addition of dispersing agents.

After wet grinding, dyestuff batches which contain textile auxiliaries and 5–95% of dyestuff are obtained on subsequent drying. Examples which may be mentioned of dispersing agents which can be used advantageously and belong to the non-ionic group are: addition products of 8 mols of ethylene oxide and 1 mol of p-tert.-octylphenol, of 15 and 6 mols of ethylene oxide and castor oil, of 20 mols of ethylene oxide and the alcohol $C_{16}H_{33}OH$, addition products of ethylene oxide and di-[α-phenylethyl]-phenols, polyethylene oxide tert.-dodecyl thioethers, polyamine-polyglycol ethers or addition products of 15 and 30 mols of ethylene oxide and 1 mol of the amine $C_{12}H_{25}NH_2$ or $C_{18}H_{37}NH_2$.

Anionic dispersing agents which may be mentioned are: sulphuric acid esters of alcohols of the fatty series with 8 to 20 carbon atoms, of the ethylene oxide adducts of the corresponding fatty acid amides or of alkylated phenols with 8 to 12 carbon atoms in the alkyl radical; sulphonic acid esters containing alkyl radicals with 8 to 20 carbon atoms; sulphation products of unsaturated fats and oils; phosphoric acid esters containing alkyl radicals with 8 to 20 carbon atoms; fatty acid soaps and also alkylarylsulphonates, condensation products of formaldehyde and naphthalenesulphonic acid and lignin-sulphonates.

Suitable cationic dispersing agents are quaternary ammonium compounds which contain an alkyl or aralkyl radical with 8 to 20 carbon atoms.

The dyestuff formulations can also contain organic solvents, especially solvents which boil above 100° C. and which preferably and miscible with water, such as mono- and di-alkyl glycol ethers, dioxane, dimethylformamide or dimethylacetamide, tetramethylenesulphone or dimethylsulphoxide, in place of the dispersing agents. Advantageously, the dyestuff, a dispersing agent and a solvent can be ground together.

In order to achieve intense dyeings on polyethylene terephthalate fibres from an aqueous dye liquor it is appropriate to add a swelling agent to the dye liquor or to carry out the dyeing process under pressure at a temperature above 100° C. Suitable swelling agents are aromatic carboxylic acids, phenols, aromatic halogen compounds or diphenyl.

In order to heat-fix the dyestuff, the padded polyester fabric is heated, advantageously after drying, and, for example, in steam or warm air, to temperatures above 100° C., for example to temperatures between 180° and 210° C.

The dyeings obtained according to the invention can be subjected to an after-treatment, for example by heating with an aqueous solution of a non-ionic detergent. According to the invention, the indicated compounds can also be applied by printing, instead of by impregnating. For this purpose, for example, a printing paste which contains the finely divided dyestuff and the auxiliary substances customarily used when printing, for example wetting agents and thickeners and, optionally, an alkali, is used.

According to the invention, strong prints with good fastness properties are obtained.

Cellulose 2½-acetate fibres are preferably dyed at temperatures of 80°–85° C., whilst cellulose triacetate fibres are advantageously dyed at the boiling point of the dye liquor. The use of dyestuff carriers or swelling agents is superfluous when dyeing cellulose 2½-acetate or polyamide fibres.

Fully synthetic fibres, especially polyester and polyamide fibres, can also be dyed, for example, in an organic solvent bath, such as in perchloroethylene or in a perchloroethylene/water emulsion or by means of the "Dybln process", as, for example, is described below, but the dyeing of these fibres is not restricted to the procedure indicated below.

In order to manufacture a printing paste, 10 parts of a paste containing the dyestuff in a concentration of 5% are stirred into a stock thickener which contains 80 parts of an emulsion thickener and 10 parts of polyethylene glycol-400. The polyester/cotton mixture (66:33) is printed with the abovementioned paste, dried at 70°–80° C. and heat-set for 30 seconds at 205° C. It is then washed with cold water and subjected to a soaping treatment.

Deep dyeings and prints which have good colour fastness properties, especially towards heat curing, sublimation, heat setting, pleating, exhaust gases, cross dyeing, dry cleaning and chlorine, and good fastness properties to wet processing, for example to water, seawater, washing and perspiration, are obtained by the process of the present invention.

The dyestuffs display a good affinity for the fibre and a good uptake. The dyeings are fast to lubricants, ozone, gas fumes, rubbing and solvents and the reserve of wool and cotton and the resistance to high temperatures are good. The discharability and the resistance to reduction (when dyeing wool) are good. The resistance to changes in the pH is also good.

It is also possible to use the new compounds, which are insoluble in water, for spin-dyeing (bulk-dyeing) polyamides, polyesters and polyolefins. The polymers intended for dyeing are appropriately dyed in the form of powders, granules or flocks, such as are obtained from the spinning solution, or are mixed in the molten state with the dyestuff, which is introduced in the dry state or in the form of a dispersion or a solution in a solvent, which can be volatile. After the dyestuff has been homogeneously distributed in the solution or the melt of the polymer, the mixture can be processed in a known manner by casting, shaping or extruding to give fibres, yarns, monofilaments, films and the like.

The examples which follow illustrate the invention. The temperatures are given in degrees centigrade and, unless otherwise stated, the parts and percentages are by weight.

EXAMPLE 8.85 parts of 5-amino-3-phenyl-1,2,4-thiadiazole are diazotised with nitrosylsulphuric acid at a temperature of 0° to 5° in a mixture consisting of 50 parts of sulphuric acid monohydrate, 50 parts of acetic acid and 10 parts of propionic acid and, after all the components have been added, the mixture is allowed to warm to room temperature and is then stirred for a further 15 hours at room temperature. 1 part of urea is then introduced and the mixture is stirred for a further hour at the same temperature.

In order to effect coupling, 2/5 of the solution, thus obtained, of the diazo compound are allowed to run, at a temperature of 0° to 5°, into a solution of 5.65 parts of the coupling component of the formula

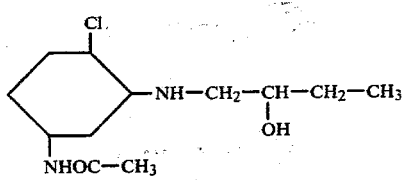

(which can contain small proportions of the isomeric compound of the formula

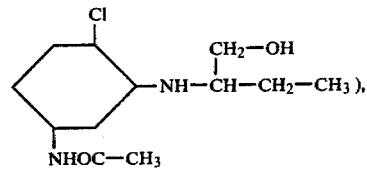

dissolved in a mixture of 60 parts of methanol and 10 parts of 2 N hydrochloric acid, whereupon virtually instantaneous coupling takes place. The product formed is isolated by filtration and then suspended in 50 parts of water and the pH value of the mixture is adjusted to 7 by adding sodium hydroxide solution. The dyestuff formed is isolated by filtration and is then purified by recrystallization from methanol.

When applied from an aqueous dispersion to a polyester by the customary dyeing methods, the dyestuff, thus obtained, of the formula

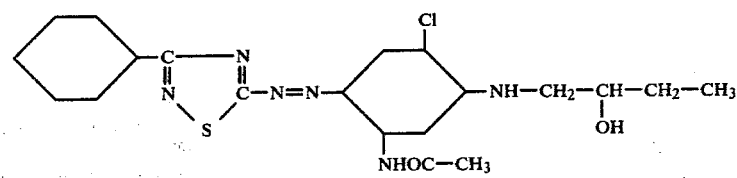

produces on this fibre brilliant, bluish-tinged red dyeings which are distinguished by good fastness to sublimation and high fastness to light.

The abovementioned coupling component is obtained by reacting 1-chloro-2-amino-4-acetylamino-benzene with butylene oxide in acetic acid at 40° C.

If, with an otherwise identical procedure, equivalent amounts of the diazo components listed in column I of the table which follows and equivalent amounts of the coupling components listed in column II are used, disperse dyestuffs which have similar properties and which dye polyester in the colour samples indicated in column III are obtained.
| | I<br>Diazo component | II<br>Coupling component | III<br>Shade on polyester |
|---|---|---|---|
| 1 | 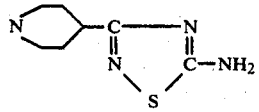 | 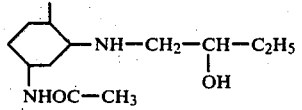 | red |
| 2 | 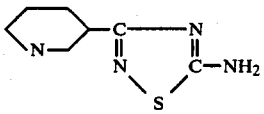 | 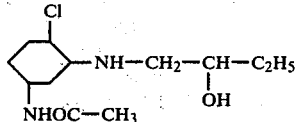 | red |
| 3 | 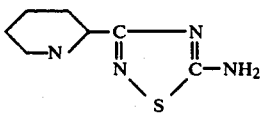 | 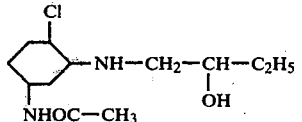 | red |
| 4 | 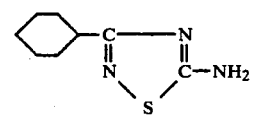 | 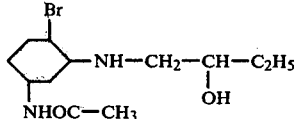 | red |
| 5 | " | 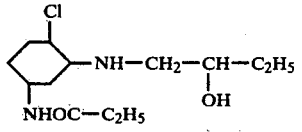 | red |
| 6 | " | 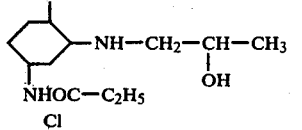 | red |
| 7 | " | 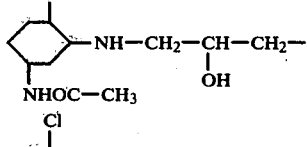 | red |
| 8 | " | 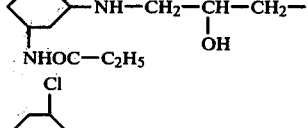 | red |
| 9 | " | 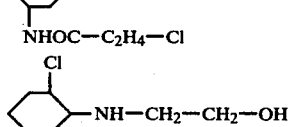 | red |
| 10 | " | 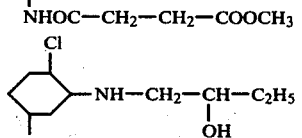 | red |
| 11 | " | 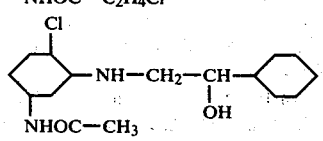 | red |
| 12 | " |  | red |

| | I<br>Diazo component | II<br>Coupling component | III<br>Shade on polyester |
|---|---|---|---|
| 13 | " | Cl, NH—(CH₂)₄—OH, NHOC—CH₃ | red |
| 14 | " | Cl, NH—C₂H₄—O—CH₃, NHOC—CH₃ | red |
| 15 | " | Cl, NH—C₂H₄—O—CH₃, NHOC—C₂H₅ | red |
| 16 | " | Cl, NH—C₂H₄—O—CH₃, NHOC—C₂H₄—Cl | red |
| 17 | " | Cl, NH—C₂H₄—O—C₂H₅, NHOC—CH₃ | red |
| 18 | " | Cl, NH—C₂H₄—O—C₂H₅, NHOC—C₂H₄—Cl | red |
| 19 | " | Cl, NH—C₂H₄—O—C₃H₇, NHOC—CH₃ | red |
| 20 | " | Cl, NH—C₂H₄—O—C₃H₇, NHOC—C₂H₅ | red |
| 21 | " | Cl, NH—CH₂—CH₂—O—⟨cyclohexyl⟩, NHOC—CH₃ | red |
| 22 | " | Cl, NH—C₂H₄—CN, NHOC—CH₃ | red |
| 23 | " | Cl, NH—C₂H₄—COOCH₃, NHOC—CH₃ | red |
| 24 | " | Cl, NH—C₂H₄—COOCH₃, NHOC—C₂H₅ | red |
| 25 | " | Cl, NH—C₂H₄—COOC₂H₅, NHOC—CH₃ | red |

-continued

| | I<br>Diazo component | II<br>Coupling component | III<br>Shade on polyester |
|---|---|---|---|
| 26 | " | ![structure: 2-Cl, 4-NHOC-CH₃ phenyl with NH-C₂H₄-COOC₃H₇] | red |
| 27 | " | ![structure: 2-Cl, 4-NHOC-CH₃ phenyl with NH-C₂H₄-COOC₄H₉] | red |
| 28 | " | ![structure: 2-Cl, 4-NHOC-CH₃ phenyl with NH-C₂H₄-COO-C₂H₄-OCH₃] | red |
| 29 | " | ![structure: 2-Cl, 4-NHOC-CH₃ phenyl with NH-C₂H₄-COO-C₂H₄-O-C₂H₅] | red |
| 30 | ![diazo: cyclic with CN, thiadiazole-NH₂] | ![structure: 2-Cl, 4-NHOC-CH₃ phenyl with NH-CH₂-CH(OH)-C₂H₅] | red |
| 31 | " | ![structure: 2-Cl, 4-NHOC-C₂H₅ phenyl with NH-CH₂-CH(OH)-C₂H₅] | red |
| 32 | " | ![structure: 2-Cl, 4-NHOC-CH₃ phenyl with NH-(CH₂)₄-OH] | red |
| 33 | " | ![structure: 2-Cl, 4-NHOC-CH₃ phenyl with NH-C₂H₄-O-C₂H₅] | red |
| 34 | " | ![structure: 2-Cl, 4-NHOC-C₂H₅ phenyl with NH-C₂H₄-O-C₂H₅] | red |
| 35 | " | ![structure: 2-Cl, 4-NHOC-CH₃ phenyl with NH-C₂H₄-O-C₃H₇] | red |
| 36 | " | ![structure: 2-Cl, 4-NHOC-CH₃ phenyl with NH-C₂H₄-COOC₂H₅] | red |
| 37 | " | ![structure: 2-Cl, 4-NHOC-CH₃ phenyl with NH-C₂H₄-COO-C₃H₇] | red |

-continued

| | I<br>Diazo component | II<br>Coupling component | III<br>Shade on polyester |
|---|---|---|---|
| 38 | ![structure: H3C-C=N, N=C-NH2, S ring (thiadiazole)] | 2-Cl, 4-NHOC-CH3, 5-NH-CH2-CH(OH)-C2H5 benzene | red |
| 39 | " | 2-Cl, 4-NHOC-C2H5, 5-NH-CH2-CH(OH)-C2H5 benzene | red |
| 40 | " | 2-Cl, 4-NHOC-C2H4-Cl, 5-NH-CH2-CH(OH)-C2H5 benzene | red |
| 41 | " | 2-Cl, 4-NHOC-CH3, 5-NH-(CH2)4-OH benzene | red |
| 42 | " | 2-Cl, 4-NHOC-CH3, 5-NH-CH2-CH(OH)-cyclohexyl benzene | red |
| 43 | " | 2-Cl, 4-NHOC-CH3, 5-NH-CH2-CH(OH)-CH2-O-phenyl benzene | red |
| 44 | " | 2-Cl, 4-NHOC-CH3, 5-NH-CH2-CH2-O-phenyl benzene | red |
| 45 | " | 2-Cl, 4-NHOC-C2H5, 5-NH-CH2-CH2-O-phenyl benzene | red |
| 46 | " | 2-Cl, 4-NHOC-CH3, 5-NH-C2H4-COOC2H5 benzene | red |
| 47 | ![structure: H5C2-C=N, N=C-NH2, S ring (thiadiazole)] | 2-Cl, 4-NHOC-CH3, 5-NH-CH2-CH(OH)-C2H5 benzene | red |
| 48 | " | 2-Cl, 4-NHOC-C2H5, 5-NH-CH2-CH(OH)-C2H5 benzene | red |
| 49 | " | 2-Cl, 4-NHOC-C2H4Cl, 5-NH-CH2-CH(OH)-C2H5 benzene | red |
| 50 | " | 2-Cl, 4-NHOC-CH3, 5-NH-(CH2)4-OH benzene | red |

-continued

| | I<br>Diazo component | II<br>Coupling component | III<br>Shade on polyester |
|---|---|---|---|
| 51 | " | (ring with Cl, NH—CH$_2$—CH(OH)—phenyl, NHOC—CH$_3$) | red |
| 52 | " | (ring with Cl, NH—CH$_2$—CH(OH)—CH$_2$—O—phenyl, NHOC—CH$_3$) | red |
| 53 | " | (ring with Cl, NH—CH$_2$—CH$_2$—O—phenyl, NHOC—CH$_3$) | red |
| 54 | " | (ring with Cl, NH—CH$_2$—CH$_2$—O—phenyl, NHOC—C$_2$H$_5$) | red |
| 55 | " | (ring with Cl, NH—CH$_2$—CH$_2$—COOC$_2$H$_5$, NHOC—CH$_3$) | red |
| 56 | Cl—C=N, C—NH$_2$, S (thiadiazole ring) | (ring with Cl, NH—CH$_2$—CH(OH)—C$_2$H$_5$, NHOC—C$_2$H$_5$) | red |
| 57 | " | (ring with Cl, NH—CH$_2$—CH(OH)—CH$_2$—O—phenyl, NHOC—CH$_3$) | red |
| 58 | " | (ring with Cl, NH—CH$_2$—CH(OH)—phenyl, NHOC—CH$_3$) | red |
| 59 | " | (ring with Cl, NH—C$_2$H$_4$—COOC$_4$H$_9$, NHOC—CH$_3$) | red |
| 60 | " | (ring with Cl, NH—C$_2$H$_4$—O—C$_2$H$_4$—CN, NHOC—CH$_3$) | red |
| 61 | H$_3$C—S—C=N, C—NH$_2$, S (thiadiazole ring) | (ring with Cl, NH—CH$_2$—CH(OH)—C$_2$H$_5$, NHOC—CH$_3$) | red |
| 62 | " | (ring with Cl, NH—CH$_2$—CH(OH)—C$_2$H$_5$, NHOC—C$_2$H$_5$) | red |
| 63 | " | (ring with Cl, NH—CH$_2$—CH(OH)—C$_2$H$_5$, NHOC—C$_2$H$_4$—Cl) | red |

| | I<br>Diazo component | II<br>Coupling component | III<br>Shade on polyester |
|---|---|---|---|
| 64 | " | 2-Cl, 4-NHOC-CH₃, 1-NH-(CH₂)₄-OH benzene | red |
| 65 | " | 2-Cl, 4-NHOC-C₂H₅, 1-NH-(CH₂)₄-OH benzene | red |
| 66 | " | 2-Cl, 4-NHOC-CH₃, 1-NH-CH₂-CH(OH)-CH₂-Cl benzene | red |
| 67 | " | 2-Cl, 4-NHOC-C₂H₅, 1-NH-CH₂-CH(OH)-CH₂-Cl benzene | red |
| 68 | " | 2-Cl, 4-NHOC-CH₃, 1-NH-CH₂-CH(OH)-C₆H₅ benzene | red |
| 69 | " | 2-Cl, 4-NHOC-CH₃, 1-NH-CH₂-CH(OH)-CH₂-O-C₆H₅ benzene | red |
| 70 | " | 2-Cl, 4-NHOC-CH₃, 1-NH-C₂H₄-O-C₂H₅ benzene | red |
| 71 | " | 2-Cl, 4-NHOC-CH₃, 1-NH-C₂H₄-O-C₃H₇ benzene | red |
| 72 | " | 2-Cl, 4-NHOC-CH₃, 1-NH-C₂H₄-O-C₂H₄-CN benzene | red |
| 73 | " | 2-Cl, 4-NHOC-CH₃, 1-NH-C₂H₄-O-C₆H₅ benzene | red |
| 74 | " | 2-Cl, 4-NHOC-C₂H₅, 1-NH-C₂H₄-O-C₆H₅ benzene | red |
| 75 | " | 2-Cl, 4-NHOC-CH₃, 1-NH-C₂H₄-O-CH₃ benzene | red |
| 76 | " | 2-Cl, 4-NHOC-C₂H₅, 1-NH-C₂H₄-O-C₃H₇ benzene | red |

| | I<br>Diazo component | II<br>Coupling component | III<br>Shade on polyester |
|---|---|---|---|
| 77 | " | 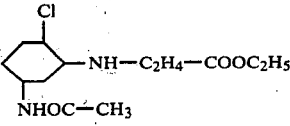 Cl, NH—C₂H₄—COOC₂H₅, NHOC—CH₃ | red |
| 78 | " | Cl, NH—C₂H₄—COOC₃H₇, NHOC—CH₃ | red |
| 79 | " | Cl, NH—C₂H₄—COOC₄H₉, NHOC—CH₃ | red |
| 80 | " | Cl, NH—C₂H₄—COO—C₂H₄—OC₂H₅, NHOC—CH₃ | red |
| 81 | " | 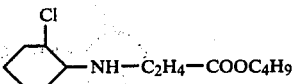 Cl, NH—C₂H₄—COO—C₂H₄—O—⟨⟩, NHOC—CH₃ | red |
| 82 | " | Cl, NH—C₂H₅, NHOC—C₂H₄—COOCH₃ | red |
| 83 | " | 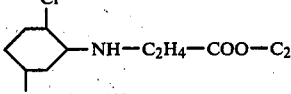 Cl, NH—C₂H₅, NHOC—CH₂—O—⟨⟩ | red |
| 84 | " | 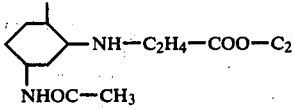 Cl, NH—C₂H₅, NHOC—CH—O—⟨⟩, CH₃ | red |
| 85 | " | 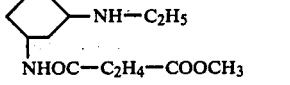 Cl, NH—C₂H₄—Cl, NHOC—CH₂—O—⟨⟩ | red |
| 86 | " | 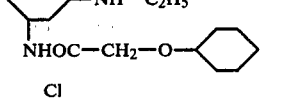 Cl, NH—C₂H₄—Br, NHOC—CH₂—O—⟨⟩ | red |
| 87 | " | 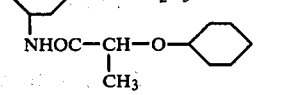 Cl, NHC₄H₉, NHOC—CH₂—O—⟨⟩ | red |
| 88 | " | 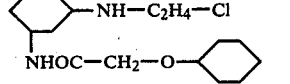 Cl, NH—CH₂—⟨⟩, NHSO₂—CH₃ | red |

|   | I Diazo component | II Coupling component | III Shade on polyester |
|---|---|---|---|
| 89 | " | ![Cl-C6H3(NHSO2CH3)-NH-CH2-CH=CH-CH3 with Cl] | red |
| 90 | H5C2—S—C(=N)—N=C(S)—NH2 (thiadiazole) | ![Cl-C6H3(NHOC-CH3)-NH-CH2-CH(OH)-C2H5] | red |
| 91 | " | ![Cl-C6H3(NHOC-C2H5)-NH-CH2-CH(OH)-C2H5] | red |
| 92 | " | ![Cl-C6H3(NHOC-C2H4-Cl)-NH-CH2-CH(OH)-C2H5] | red |
| 93 | " | ![Cl-C6H3(NHOC-CH3)-NH-(CH2)4-OH] | red |
| 94 | " | ![Cl-C6H3(NHOC-C2H5)-NH-(CH2)4-OH] | red |
| 95 | " | ![Cl-C6H3(NHOC-CH3)-NH-CH2-CH(OH)-CH2-Cl] | red |
| 96 | " | ![Cl-C6H3(NHOC-C2H5)-NH-CH2-CH(OH)-CH2Cl] | red |
| 97 | " | ![Cl-C6H3(NHOC-CH3)-NH-CH2-CH(OH)-C6H11] | red |
| 98 | " | ![Cl-C6H3(NHOC-CH3)-NH-CH2-CH(OH)-CH2-O-C6H11] | red |
| 99 | " | ![Cl-C6H3(NHOC-CH3)-NH-C2H4-O-C2H5] | red |
| 100 | " | ![Cl-C6H3(NHOC-CH3)-NH-C2H4-O-C3H7] | red |
| 101 | " | ![Cl-C6H3(NHOC-CH3)-NH-C2H4-O-C2H4-CN] | red |

-continued
| | I<br>Diazo component | II<br>Coupling component | III<br>Shade on polyester |
|---|---|---|---|
| 102 | " | 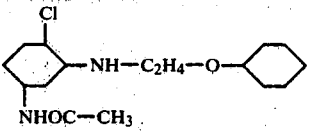 | red |
| 103 | " | 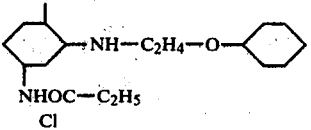 | red |
| 104 | " | 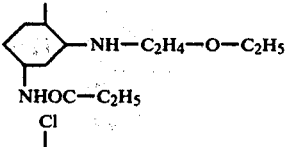 | red |
| 105 | " | 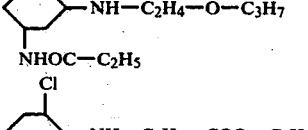 | red |
| 106 | " | 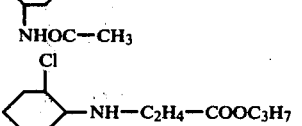 | red |
| 107 | " | 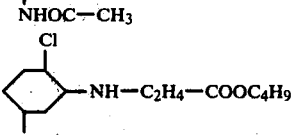 | red |
| 108 | " | 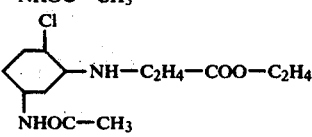 | red |
| 109 | " | 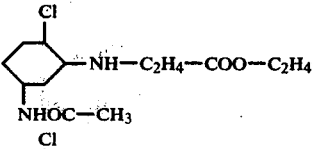 | red |
| 110 | " | 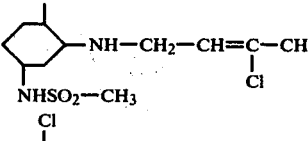 | red |
| 111 | " | 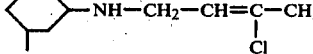 | red |
| 112 | " | 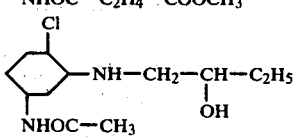 | red |
| 113 | 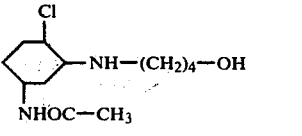 |  | red |
| 114 | " |  | red |

-continued

| | I<br>Diazo component | II<br>Coupling component | III<br>Shade on polyester |
|---|---|---|---|
| 115 | " | 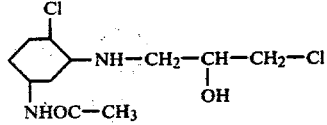 Cl, NH—CH₂—CH(OH)—CH₂—Cl, NHOC—CH₃ on benzene ring | red |
| 116 | " | 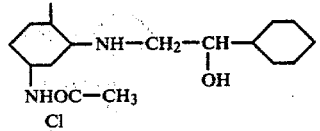 Cl, NH—CH₂—CH(OH)—C₆H₅, NHOC—CH₃ | red |
| 117 | " | 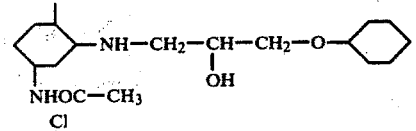 Cl, NH—CH₂—CH(OH)—CH₂—O—C₆H₅, NHOC—CH₃ | red |
| 118 | " | Cl, NH—C₂H₄—O—C₂H₅, NHOC—CH₃ | red |
| 119 | " | Cl, NH—C₂H₄—O—C₃H₇, NHOC—CH₃ | red |
| 120 | " | Cl, NH—C₂H₄—O—C₂H₄—CN, NHOC—CH₃ | red |
| 121 | " | Cl, NH—C₂H₄—O—C₆H₅, NHOC—CH₃ | red |
| 122 | " | Cl, NH—C₂H₄—COOC₂H₅, NHOC—CH₃ | red |
| 123 | " | Cl, NH—C₂H₄—COOC₃H₇, NHOC—CH₃ | red |
| 124 | " | Cl, NH—C₂H₄—COO—C₄H₉, NHOC—CH₃ | red |
| 125 | 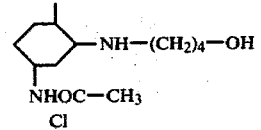 cyclohexyl-S-C(=N)-N=C(NH₂)-S (thiadiazole with NH₂) | Cl, NH—CH₂—CH(OH)—C₂H₅, NHOC—CH₃ | red |
| 126 | " | Cl, NH—(CH₂)₄—OH, NHOC—CH₃ | red |
| 127 | " | Cl, NH—CH₂—CH(OH)—CH₂Cl, NHOC—CH₃ | red |

-continued

| | I<br>Diazo component | II<br>Coupling component | III<br>Shade on polyester |
|---|---|---|---|
| 128 | " | (Cl, NHOC—CH₃)-phenyl—NH—C₂H₄—O—C₂H₅ | red |
| 129 | " | (Cl, NHOC—CH₃)-phenyl—NH—C₂H₄—O—C₃H₇ | red |
| 130 | " | (Cl, NHOC—CH₃)-phenyl—NH—C₂H₄—O—C₂H₄—CN | red |
| 131 | " | (Cl, NHOC—CH₃)-phenyl—NH—C₂H₄—COOC₂H₅ | red |
| 132 | " | (Cl, NHOC—CH₃)-phenyl—NH—C₂H₄—COOC₃H₇ | red |
| 133 | " | (Cl, NHOC—CH₃)-phenyl—NH—C₂H₄—COOC₄H₉ | red |
| 134 | " | (Cl, NHOC—CH₃)-phenyl—NH—C₂H₄—COO—C₂H₄—OC₂H₅ | red |
| 135 | H₃C—OOC—C₂H₄—S—C(=N—N=)—S—C—NH₂ (thiadiazole) | (Cl, NHOC—CH₃)-phenyl—NH—CH₂—CH(OH)—C₂H₅ | red |
| 136 | " | (Cl, NHOC—C₂H₅)-phenyl—NH—CH₂—CH(OH)—C₂H₅ | red |
| 137 | " | (Cl, NHOC—CH₃)-phenyl—NH—CH₂—CH(OH)—CH₃ | red |
| 138 | " | (Cl, NHOC—CH₃)-phenyl—NH—CH₂—CH(OH)—CH₂Cl | red |
| 139 | " | (Cl, NHOC—C₂H₅)-phenyl—NH—CH₂—CH(OH)—CH₂—Cl | red |
| 140 | " | (Cl, NHOC—CH₃)-phenyl—NH—CH₂—CH(OH)—cyclohexyl | red |

-continued

| | I<br>Diazo component | II<br>Coupling component | III<br>Shade on polyester |
|---|---|---|---|
| 141 | " | ![](Cl, NH—(CH2)4—OH, NHOC—CH3 on ring) | red |
| 142 | " | ![](Cl, NH—C2H4—O—C2H5, NHOC—CH3) | red |
| 143 | H3COOC—C2H4—S—C(=N)—N=C(—NH2)—S (thiadiazole) | ![](Cl, NH—C2H4—O—C3H7, NHOC—CH3) | red |
| 144 | " | ![](Cl, NH—C2H4—O—C2H4—CN, NHOC—CH3) | red |
| 145 | " | ![](Cl, NH—C2H4—O—⟨cyclohexyl⟩, NHOC—CH3) | red |
| 146 | " | ![](Cl, NH—C2H4—O—⟨cyclohexyl⟩, NHOC—C2H5) | red |
| 147 | " | ![](Cl, NH—C2H4—COOC2H5, NHOC—CH3) | red |
| 148 | " | ![](Cl, NH—C2H4—COOC3H7, NHOC—CH3) | red |
| 149 | " | ![](Cl, NH—C2H4—COOC4H9, NHOC—CH3) | red |
| 150 | " | ![](Cl, NH—C2H4—COO—C2H4—O—C2H5, NHOC—CH3) | red |
| 151 | H5C2OOC—C2H4—S—C(=N)—N=C(—NH2)—S (thiadiazole) | ![](Cl, NH—CH2—CH(OH)—C2H5, NHOC—CH3) | red |
| 152 | " | ![](Cl, NH—CH2—CH(OH)—CH3, NHOC—CH3) | red |
| 153 | " | ![](Cl, NH—CH2—CH(OH)—CH2Cl, NHOC—CH3) | red |

-continued

| | I<br>Diazo component | II<br>Coupling component | III<br>Shade on polyester |
|---|---|---|---|
| 154 | " | ![Cl, NH—CH₂—CH(OH)—C₆H₁₁, NHOC—CH₃ on benzene] | red |
| 155 | " | ![Cl, NH—(CH₂)₄—OH, NHOC—CH₃ on benzene] | red |
| 156 | " | ![Cl, NH—C₂H₄—O—C₂H₅, NHOC—CH₃ on benzene] | red |
| 157 | " | ![Cl, NH—C₂H₄—O—C₃H₇, NHOC—CH₃ on benzene] | red |
| 158 | " | ![Cl, NH—C₂H₄—O—C₂H₄—CN, NHOC—CH₃ on benzene] | red |
| 159 | " | ![Cl, NH—C₂H₄—O—C₆H₁₁, NHOC—CH₃ on benzene] | red |
| 160 | " | ![Cl, NH—C₂H₄—O—COOC₂H₅, NHOC—CH₃ on benzene] | red |
| 161 | " | ![Cl, NH—C₂H₄—COOC₃H₇, NHOC—CH₃ on benzene] | red |
| 162 | " | ![Cl, NH—C₂H₄—COOC₄H₉, NHOC—CH₃ on benzene] | red |
| 163 | " | ![Cl, NH—C₂H₄—COO—C₂H₄—O—C₂H₅, NHOC—CH₃ on benzene] | red |
| 164 | " | ![Cl, NH—C₂H₄—COO—C₂H₄—O—C₆H₁₁, NHOC—CH₃ on benzene] | red |
| 165 | " | ![Cl, NH—CH₂—CH=C(Cl)—CH₃, NHOC—CH₃ on benzene] | red |
| 166 | H₇C₃OOC—C₂H₄—S—C(=N)—N=C(NH₂)—S (thiadiazole) | ![Cl, NH—CH₂—CH(OH)—C₂H₅, NHOC—CH₃ on benzene] | red |

-continued

| | I<br>Diazo component | II<br>Coupling component | III<br>Shade on polyester |
|---|---|---|---|
| 167 | " | 2-Cl, 4-NHOC-CH₃, 1-NH-CH₂-CH(OH)-CH₃ (phenyl) | red |
| 168 | " | 2-Cl, 4-NHOC-CH₃, 1-NH-CH₂-CH(OH)-CH₂Cl (phenyl) | red |
| 169 | " | 2-Cl, 4-NHOC-CH₃, 1-NH-CH₂-CH(OH)-C₆H₁₁ (phenyl) | red |
| 170 | " | 2-Cl, 4-NHOC-CH₃, 1-NH-(CH₂)₄-OH (phenyl) | red |
| 171 | " | 2-Cl, 4-NHCOCH₃, 1-NH-C₂H₄-O-C₂H₅ (phenyl) | red |
| 172 | " | 2-Cl, 4-NHOC-CH₃, 1-NH-C₂H₄-O-C₃H₇ (phenyl) | red |
| 173 | " | 2-Cl, 4-NHOC-CH₃, 1-NH-C₂H₄-O-C₂H₄-CN (phenyl) | red |
| 174 | " | 2-Cl, 4-NHOC-CH₃, 1-NH-C₂H₄-O-C₆H₁₁ (phenyl) | red |
| 175 | " | 2-Cl, 4-NHOC-CH₃, 1-NH-C₂H₄-COOC₂H₅ (phenyl) | red |
| 176 | " | 2-Cl, 4-NHOC-CH₃, 1-NH-C₂H₄-COOC₃H₇ (phenyl) | red |
| 177 | " | 2-Cl, 4-NHOC-CH₃, 1-NH-C₂H₄-COOC₄H₉ (phenyl) | red |
| 178 | " | 2-Cl, 4-NHOC-CH₃, 1-NH-C₂H₄-COO-C₂H₄-O-C₂H₅ (phenyl) | red |
| 179 | " | 2-Cl, 4-NHOC-CH₃, 1-NH-C₂H₄-COO-C₂H₄-O-C₆H₁₁ (phenyl) | red |

-continued

| | I<br>Diazo component | II<br>Coupling component | III<br>Shade on polyester |
|---|---|---|---|
| 180 | " | Cl, NH—CH₂—CH=C(Cl)—CH₃ / NHOC—CH₃ (on benzene ring) | red |
| 181 | HO—C₂H₄—OOC—C₂H₄—S—C(=N)—N=C(—NH₂)—S (thiadiazole) | Cl, NH—C₂H₅ / NHOC—CH₃ | red |
| 182 | " | Br, NH—C₂H₅ / NHOC—CH₃ | red |
| 183 | " | Cl, NH—C₃H₇ / NHOC—CH₃ | red |
| 184 | " | Cl, NH—C₄H₉ / NHOC—CH₃ | red |
| 185 | " | Cl, NH—CH₂—(cyclohexyl) / NHOC—CH₃ | red |
| 186 | " | Cl, NH—C₂H₄—Cl / NHOC—CH₃ | red |
| 187 | " | Cl, NH—C₂H₄—Br / NHOC—CH₃ | red |
| 188 | " | Cl, NH—CH₂—CH=C(Cl)—CH₃ / NHOC—CH₃ | red |
| 189 | HO—C₂H₄—S—C(=N)—N=C(—NH₂)—S (thiadiazole) | Cl, NH—CH₂—CH(OH)—C₂H₅ / NHOC—CH₃ | red |
| 190 | " | Cl, NH—C₂H₄—O—(cyclohexyl) / NHOC—CH₃ | red |
| 191 | " | Cl, NH—C₂H₄—O—C₂H₅ / NHOC—CH₃ | red |
| 192 | " | Cl, NH—C₂H₄—O—CH₃ / NHOC—CH₃ | red |

| No. | Diazo component | Coupling component | Shade on polyester |
|---|---|---|---|
| 193 | " | 1-Cl, 4-NHOC-CH₃ cyclohexyl with NH-C₂H₄-COOC₄H₉ | red |
| 194 | " | 1-Cl, 4-NHOC-CH₃ cyclohexyl with NH-CH₂-C₆H₁₁ | red |
| 195 | " | 1-Cl, 4-NHOC-CH₃ cyclohexyl with NH-CH₂-CH=C(Cl)-CH₃ | red |
| 196 | " | 1-Cl, 4-NHOC-CH₃ cyclohexyl with NH-C₄H₉ | red |
| 197 | $H_3C-O-C_2H_4-S-C(=N-)N(-S-)$ thiadiazole-C-NH₂ | 1-Cl, 4-NHOC-CH₃ cyclohexyl with NH-CH₂-CH(OH)-C₂H₅ | red |
| 198 | " | 1-Cl, 4-NHOC-CH₃ cyclohexyl with NH-C₂H₄-O-C₆H₁₁ | red |
| 199 | " | 1-Cl, 4-NHOC-CH₃ cyclohexyl with NH-C₂H₄-O-C₃H₇ | red |
| 200 | " | 1-Cl, 4-NHOC-CH₃ cyclohexyl with NH-C₂H₄-COO-C₃H₇ | red |
| 201 | " | 1-Cl, 4-NHOC-CH₃ cyclohexyl with NH-C₄H₉ | red |
| 202 | " | 1-Cl, 4-NHOC-CH₃ cyclohexyl with NH-CH₂-CH=C(Cl)-CH₃ | red |
| 203 | $H_5C_2-O-C_2H_4-S-C(=N-)N(-S-)$ thiadiazole-C-NH₂ | 1-Cl, 4-NHOC-CH₃ cyclohexyl with NH-CH₂-CH(OH)-C₂H₅ | red |
| 204 | " | 1-Cl, 4-NHOC-CH₃ cyclohexyl with NH-CH₂-CH(OH)-C₆H₁₁ | red |
| 205 | " | 1-Cl, 4-NHOC-CH₃ cyclohexyl with NH-C₂H₄-O-C₆H₁₁ | red |

-continued
| | I<br>Diazo component | II<br>Coupling component | III<br>Shade on polyester |
|---|---|---|---|
| 206 | '' | 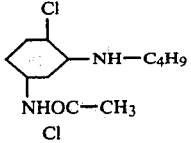 | red |
| 207 | '' | 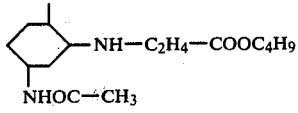 | red |
| 208 | '' | 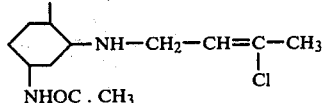 | red |
| 209 | 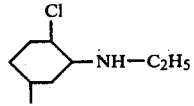 | 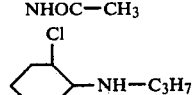 | red |
| 210 | '' | 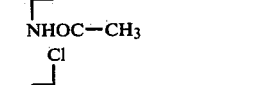 | red |
| 211 | '' | 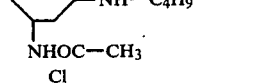 | red |
| 212 | '' | 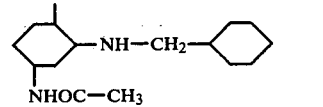 | red |
| 213 | '' | 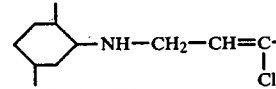 | red |
| 214 | 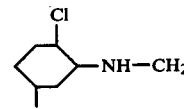 | 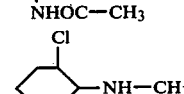 | red |
| 215 | '' | 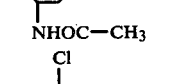 | red |
| 216 | '' | 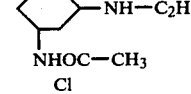 | red |
| 217 | '' | | red |
| 218 | '' | | red |

-continued

| | I<br>Diazo component | II<br>Coupling component | III<br>Shade on polyester |
|---|---|---|---|
| 219 | " | 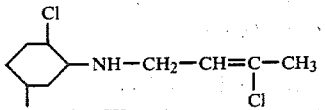 | red |
| 220 | 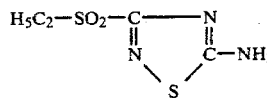 | 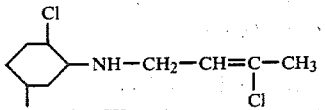 | red |
| 221 | " | 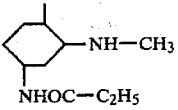 | red |
| 222 | " | 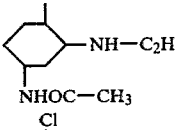 | red |
| 223 | " | 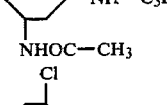 | red |
| 224 | " | 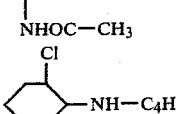 | red |
| 225 | " | 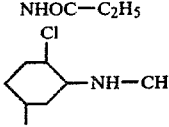 | red |
| 226 | " | 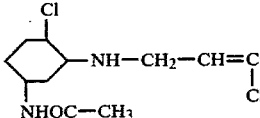 | red |
| 227 | " | 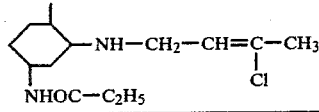 | red |
| 228 | " | 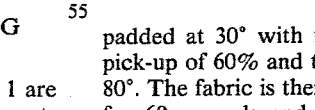 | red |

DYEING INSTRUCTIONS (HEAT-FIXING PROCESS)

20 parts of the dyestuff according to Example 1 are ground with 140 parts of water which contain 40 parts of sodium dinaphthylmethanedisulphonate.

A padding liquor is prepared from 200 parts of the above dyestuff formulation, 100 parts of carboxymethylcellulose (in the form of a 4% strength aqueous solution) and 700 parts of water by stirring the dyestuff formulation described above into the pre-diluted thickener with the aid of a high-speed stirrer and then adjusting the pH value of the mixture to 6 with the aid of 80% strength acetic acid. A fabric made of polyester fibres is padded at 30° with this liquor and squeezed off to a pick-up of 60% and the material is then dried at 70° to 80°. The fabric is then heated to 210° on a tenter frame for 60 seconds and subsequently is washed hot and rinsed well with cold water. A fabric dyed bluish-tinged red with good fastness properties is obtained.

DYEING INSTRUCTIONS (HIGH TEMPERATURE PROCESS)

1 part of the dyestuff obtained according to Example 1 is ground with 2 parts of a 50% strength aqueous solution of the sodium salt of dinaphthylmethanedisulphonic acid and the mixture is dried.

This dyestuff formulation is stirred with 40 parts of a 10% strength aqueous solution of the sodium salt of N-benzyl-n-heptadecyl-benzimidazoledisulphonic acid and 4 parts of a 40% strength acetic acid solution are added. 4,000 parts of a dye liquor are then prepared by diluting this mixture with water.

100 parts of a cleaned polyethylene terephthalate fibre material are introduced into this liquor at 50°, the temperature is raised to 120° to 130° in the course of half an hour and dyeing is carried out at this temperature for one hour in a closed vessel. A bluish-tinged red dyeing with excellent fastness to light and sublimation is obtained.

Unless otherwise stated, the colour shades indicated in the examples have been obtained with the aid of the high temperature process.

We claim:

1. A dyestuff of the formula

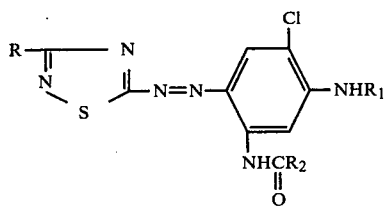

wherein R is hydrogen, methyl, ethyl, chloro, phenyl, pyridyl or $C_1$–$C_4$-alkylthio;
$R_1$ is $C_1$–$C_4$-alkyl or $C_1$–$C_4$-alkyl substituted by hydroxy, $C_1$–$C_4$-alkoxy, chloro, phenyl or phenoxy;
$R_2$ is methyl or ethyl.

2. The dyestuff of claim 1, wherein R is pyridyl.
3. The dyestuff of claim 1, wherein R is phenyl.
4. The dyestuff of claim 3, wherein $R_1$ is β-phenoxyethyl and $R_2$ is methyl.
5. A dyestuff of the formula

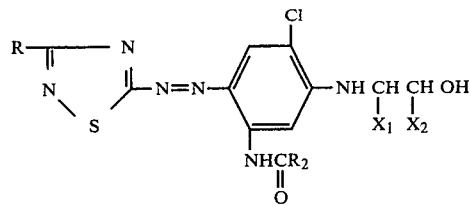

wherein R is hydrogen, methyl, ethyl, chloro, phenyl, pyridyl or $C_1$–$C_4$-alkylthio;
one of $X_1$ and $X_2$ is hydrogen and the other is $C_1$–$C_4$-alkyl or $C_1$–$C_4$-alkyl substituted by chlorine, phenoxy or phenyl; and
$R_2$ is methyl or ethyl.

6. A dyestuff of claim 5, wherein $X_1$ or $X_2$ is methyl or ethyl.
7. A dyestuff of claim 5, wherein $X_1$ or $X_2$ is $C_1$–$C_4$-alkyl substituted by phenyl.
8. A dyestuff of claim 5, wherein $X_1$ or $X_2$ is phenoxymethyl.
9. A dyestuff of claim 5, wherein $X_1$ or $X_2$ is chloromethyl.
10. The dyestuff of claim 5, wherein R is phenyl, $X_1$ is hydrogen, $X_2$ is ethyl and $R_2$ is methyl.
11. The dyestuff of claim 9, wherein R is phenyl, $X_1$ is hydrogen, $X_2$ is chloromethyl and $R_2$ is methyl.

* * * * *